United States Patent
Hayashi

(10) Patent No.: US 6,906,488 B2
(45) Date of Patent: Jun. 14, 2005

(54) POSITION CONTROL SYSTEM FOR USE IN DRIVING SYSTEM TRANSMITTING DRIVING FORCE OF DRIVING SOURCE TO DRIVEN MEMBER THROUGH POWER TRANSMISSION MECHANISM, IMAGE FORMING APPARATUS, POSITION CONTROL METHOD, PROGRAM FOR PERFORMING THE POSITION CONTROL METHOD, AND STORAGE MEDIUM HAVING THE PROGRAM STORED THEREON

(75) Inventor: Tadashi Hayashi, Kanagawa (JP)

(73) Assignee: Canan Kabushiki Kaisha, Tokyo (JP)

( * ) Notice: Subject to any disclaimer, the term of this patent is extended or adjusted under 35 U.S.C. 154(b) by 121 days.

(21) Appl. No.: 10/419,355

(22) Filed: Apr. 21, 2003

(65) Prior Publication Data

US 2003/0201600 A1 Oct. 30, 2003

(30) Foreign Application Priority Data

Apr. 24, 2002 (JP) .................................. 2002-122952
Apr. 2, 2003 (JP) .................................. 2003-099532

(51) Int. Cl.$^7$ .......................... G05B 19/02; G05B 11/42
(52) U.S. Cl. ........................ 318/567; 318/610; 318/624
(58) Field of Search ........................... 318/560, 567, 318/599, 605, 609, 610, 612, 624, 630, 631

(56) References Cited

U.S. PATENT DOCUMENTS

| | | | | |
|---|---|---|---|---|
| 3,700,379 A | * | 10/1972 | Robertson | ................. 318/561 |
| 3,731,176 A | * | 5/1973 | Mitchell et al. | .......... 318/619 |
| 4,117,382 A | * | 9/1978 | Yonemoto | ................. 318/163 |
| 5,736,824 A | * | 4/1998 | Sato et al. | ................ 318/561 |
| 6,538,407 B2 | * | 3/2003 | Tanaka | ...................... 318/445 |

* cited by examiner

*Primary Examiner*—Bentsu Ro
(74) *Attorney, Agent, or Firm*—Cowan, Liebowitz & Latman, P.C.

(57) ABSTRACT

A position control system uses a speed command supplied to a driving source. The speed command has a change pattern which has an acceleration section (1) for eliminating a dead zone of a power transmission mechanism, a constant-speed section (or an acceleration section with a slower acceleration than in the section (1)), an acceleration section (3) up to the maximum speed, a constant-speed section (4), a deceleration section (5), a constant-speed section (6) for eliminating the dead zone (or a deceleration section with a slower deceleration than in the section (5)), and a deceleration (7) for stopping at a target section. Even when a driven member has large inertia, the position thereof is accurately controlled to the target position in a semi-closed position control system.

22 Claims, 11 Drawing Sheets

POSITION CONTROL SYSTEM FOR USE IN DRIVING SYSTEM TRANSMITTING DRIVING FORCE OF DRIVING SOURCE TO DRIVEN MEMBER THROUGH POWER TRANSMISSION MECHANISM, IMAGE FORMING APPARATUS, POSITION CONTROL METHOD, PROGRAM FOR PERFORMING THE POSITION CONTROL METHOD, AND STORAGE MEDIUM HAVING THE PROGRAM STORED THEREON

BACKGROUND OF THE INVENTION

Field of the Invention

The present invention relates to a position control system for use in a driving system which transmits driving force of a driving source to a driven member through a power transmission mechanism, a position control method, a program for performing the position control method, and a storage medium which has the program stored thereon. The present invention is suitable for position control for a driven member which has large inertia, such as a development unit or an intermediate transfer drum of an image forming apparatus.

A power transmission mechanism is often provided between a driving source and a driven member. Especially when position control is performed on a driven member (a load) which has relatively large inertia such as a development unit switcher in a multicolor image forming apparatus such as a printer, a power transmission mechanism such as a gear train connects a motor serving as a driving source to a load in many cases in consideration of the efficiency, arrangement and the like of the motor. This is often the case with a DC motor used as the driving source since high efficiency is achieved in driving at a high speed.

The power transmission mechanism always involves a so-called mechanical dead zone (hereinafter referred to as "play") such as backlash and rattle in a gear train. When a position detector such as a rotary encoder is directly connected to the load, a control system is likely to operate unstably due to the play in the gear train or the like. Also, the encoder needs to deal with pulses at a high frequency to provide a required resolution, thereby causing a higher cost. To avoid these situations, the position detector is often connected to the motor shaft. This is called a semi-closed control system.

To perform position control with high accuracy and little noise, a speed table is often used to control a motor. For example, Japanese Patent Application Laid-Open No. 1982-132797 proposes a control method in which the smoothest possible curve is typically used in the speed table as shown in FIG. 12 in view of noise and the like.

As described above, the power transmission mechanism has play therein. For example, when the power transmission mechanism is used to drive a load which has relatively large inertia, for example a development unit switcher in a multicolor image forming apparatus, a large reduction ratio is set and thus the play is increased.

If such a system is subjected to position control in the aforementioned semi-closed system, the control results may vary greatly depending on an initial state.

For example, when acceleration is performed in accordance with the smooth curve in the speed table as shown in FIG. 12, the inertial loads of a load (a driven member) and a motor are coupled together from the start if the power transmission mechanism has no play in a forward direction in the initial state. When the acceleration curve is appropriately designed, the load and the motor are smoothly accelerated in unison following a command speed as shown by a dotted line in FIG. 13.

On the other hand, if the power transmission mechanism has play in the forward direction in the initial state, only the inertial load of the motor is driven at first. Thus, the position detected by the position detector moves to follow the command speed, but the load does not move.

As the play in the power transmission mechanism is eliminated, the gear train starts elastic deformation. Thereafter, the load cannot be accelerated until the two masses (the motor and the load) start moving in unison as shown in FIG. 14. In FIG. 14, a dotted line shows the motion of the motor, while a dash dotted line shows the motion of the load.

At this point, the position of the load lags behind the position of the motor, and the lag cannot be made up for immediately. As a result, a large overshoot may occur near a target position as shown in FIG. 15.

SUMMARY OF THE INVENTION

According to an aspect, the present invention provides a position control method for use in a driving apparatus comprising a driving source which drives a driven member through a power transmission mechanism and position detecting circuit detecting a driving position of the driving source, and outputting a speed command to the driving source to perform speed control, the method of performing control such that the driving position detected by the position detecting circuit reaches a target position, the method comprising the steps of:

upon acceleration, changing the speed command to an acceleration side at a change rate to drive the driving source with acceleration by a driving amount corresponding to a dead zone of the power transmission mechanism, and then maintaining the speed command constant or changing the speed command to the acceleration side at a change rate to cause a driving speed of the driven member to reach a speed corresponding to a speed of the driving source and a design speed change ratio of the power transmission mechanism; and upon deceleration, changing the speed command to a deceleration side at a change rate to drive the driving source with deceleration by the driving amount corresponding to a dead zone of the power transmission mechanism, and then maintaining the speed command constant or changing the speed command to the deceleration side at a change rate to cause a driving speed of the driven member to reach a speed corresponding to a speed of the driving source and a design speed change ratio of the power transmission mechanism.

According to the aspect, the driving source and the driven member easily follow the command speed and can be stopped accurately at the target position.

According to another aspect, the present invention provides a position control system comprising a driving source which drives a driven member through a power transmission mechanism and position detecting circuit detecting a driving position of the driving source, and outputting a speed command to the driving source to perform speed control, the system of performing control such that the driving position detected by the position detecting circuit reaches a target position, the system performing:

upon acceleration, changing the speed command to an acceleration side at a change rate to drive the driving source with acceleration by a driving amount corresponding to a dead zone of the power transmission mechanism, and then maintaining the speed command constant or changing the speed command to an acceleration side at a change rate to cause a driving speed of the driven member to reach a speed corresponding to a speed of the driving source and a design speed change ratio of the power transmission mechanism; and upon deceleration, changing the speed command to a deceleration side at a change rate to drive the driving source with deceleration by a driving amount corresponding to a dead zone of the power transmission mechanism, and then maintaining the speed command constant or changing the speed command to the deceleration side at a change rate to cause a driving speed of the driven member to reach a speed corresponding to a speed of the driving source and a design speed change ratio of the power transmission mechanism.

According to the aspect, the driving source and the driven member easily follow the command speed and can be stopped accurately at the target position.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

Hereinafter, preferred embodiments of the invention will be described in detail with reference to the drawings.

Figure 1:
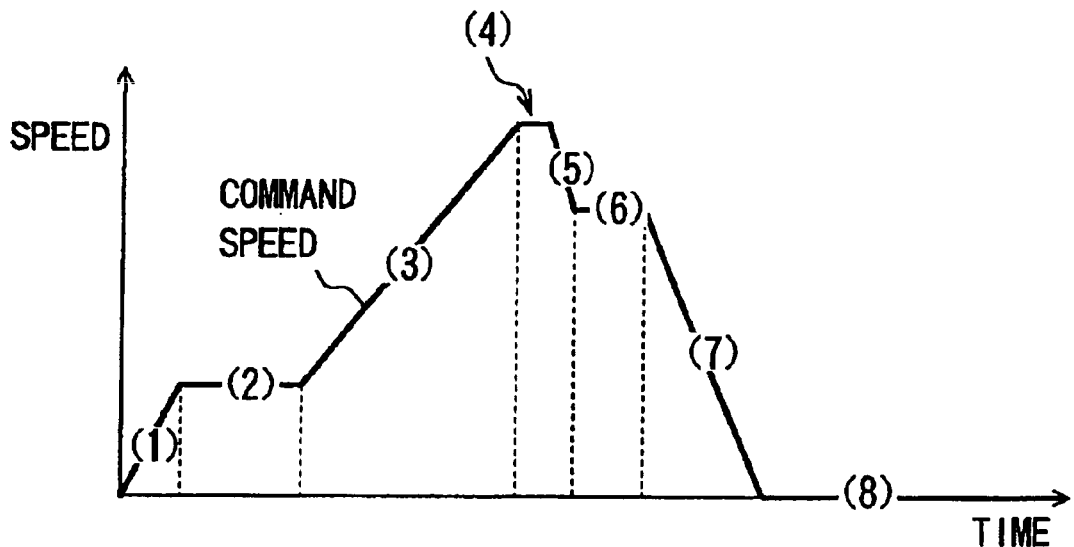
FIG. 1 shows the change pattern of a command speed used by a position control system which is an embodiment of the present invention.
Figure 2:
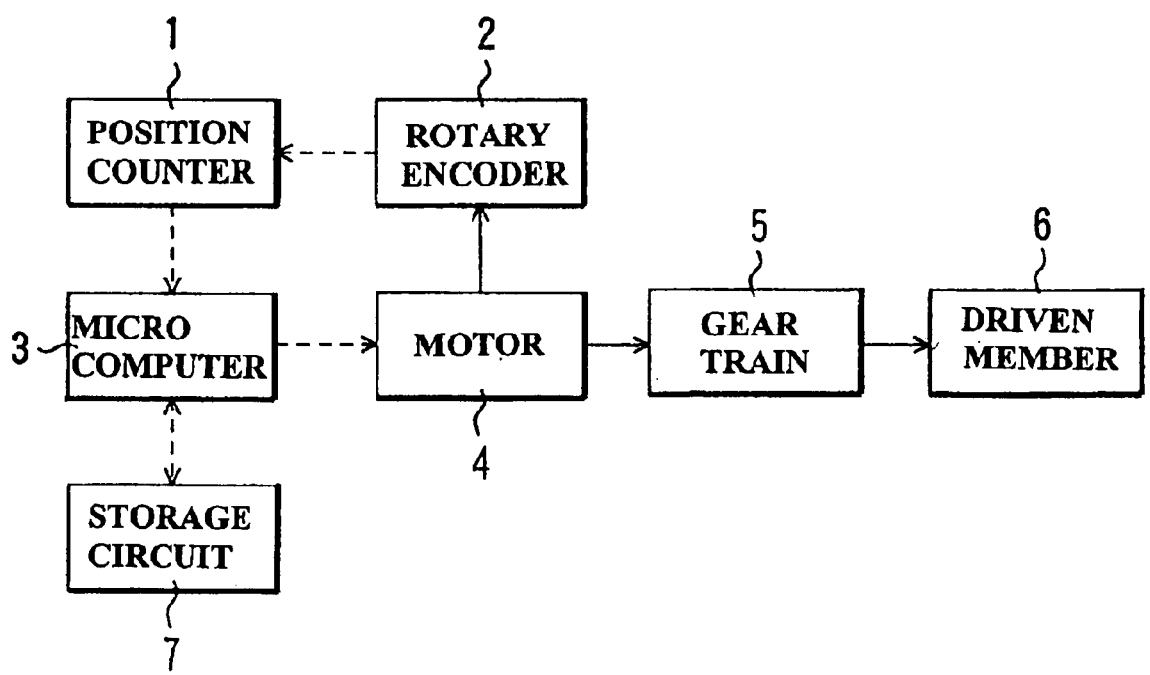
FIG. 2 is a block diagram showing the structure of the position control system.

FIG. 1 shows a speed table illustrating the change pattern of a command speed (speed command value) of a motor in a position control system which is an embodiment of the present invention. FIG. 2 is a block diagram of the position control system.

In FIG. 2, electrical connections and mechanical connections between components are shown by dotted lines and solid lines, respectively. A rotary encoder 2 serving as a position sensor is directly connected to the shaft of a DC motor 4 without interposing any transmission mechanism between them. The rotary encoder 2 outputs a pulse signal which includes information about a direction of rotation. The pulse signal is up/down counted by a position counter 1 to provide information about a driving position (an amount of rotation) of the motor 4.

A gear train (including a single gear) 5 serving as a power transmission mechanism decelerates the rotation produced by the motor 4 and increases torque. The gear train 5 has play as a mechanical dead zone. The substantially accurate amount of the play can be known by making measurement in advance.

A storage circuit 7 has stored therein a speed table and various control parameters used when a driven member 6 serving as a load is subjected to position control. The storage circuit 7 outputs them to a microcomputer 3 serving as a driving control circuit in response to a request from the microcomputer 3. The microcomputer 3 reads a program recorded in the storage circuit 7 or on another storage medium and executes the program to perform processing in the embodiment.

The microcomputer 3 compares a command position obtained by integrating values in the speed table read from the storage circuit 7 with the current driving position provided from the position counter 1 to perform proportional, integral, derivative operations or the like on the deviation of the current position from the command position. The microcomputer 3 increases or decreases the pulse width (duty ratio) of a driving signal supplied to the DC motor 4 to cause the DC motor 4 to follow the speed command values in the acceleration/deceleration table. In this case, if the microcomputer 3 performs the acceleration/deceleration control based on the smoothly changing curve in the speed table as conventional, the actual driving speed of the motor cannot follow the command speed to cause a large overshoot of the driven member since the speed of the load suddenly changes on a certain initial condition of the play, as shown in FIGS.

14 and 15. In contrast, in the embodiment, the control is performed on the basis of the speed table as shown in FIG. 1. Next, each section in the speed table in FIG. 1 is described.

(1) First Acceleration Section (First Speed Control Step)

For driving only the load of the motor itself, such as the rotor or the output shaft which are components of the motor, the command speed is increased at a first change rate so as to provide an acceleration which the speed of the motor 4 can follow readily.

(2) First Constant-Speed Section (Second Speed Control Step)

In this section, the command speed is set to be constant (with the acceleration equal to zero) until the elastic deformation of the gear train 5 serving as the power transmission mechanism reaches a state of equilibrium, specifically, until the motor 4, the gear train 5, and the driven member 6 start moving substantially in unison, and the speed of the motor 4 and the speed of the driven member 6 to which the driving force from the motor 4 starts to be transmitted substantially establish the relationship corresponding to the design reduction ratio of the power transmission mechanism.

(3) Second Acceleration Section (Third Speed Control Step)

The command speed is increased at a change rate lower than the aforementioned first change rate so as to provide an acceleration which the two inertias of the motor 4 and the driven member 6 can follow readily until the motor 4 reaches the maximum speed. When the driven member 6 is to be moved over a short distance (the command position is not so away from the driving position provided from the aforementioned position counter 1 before the motor is driven), the command speed is increased until the speed of the motor 4 reaches a speed required to move the driven member 6 over that distance.

(4) Second Constant-Speed Section

The command speed is set to be constant to drive the motor 4 at the maximum speed until the position at which deceleration is started. When the driven member 6 is to be moved over a short distance, this section may be equal to zero second.

(5) First Deceleration Section (Fourth Speed Control Step)

For driving only the load of the motor 4 itself, the command speed is decreased at a second change rate so as to provide a negative acceleration which the speed of the motor 4 can follow readily.

(6) Third Constant-Speed Section (Fifth Speed Control Step)

In this section, the command speed is set to be constant (with the negative acceleration equal to zero) until the elastic deformation of the gear train 5 serving as the power transmission mechanism reaches the state of equilibrium, specifically, after the previously decelerated motor 4 and the driven member 6 are separated from each other, until they again start moving substantially in unison, and the speed of the driven member 6 with respect to the speed of the motor 4 is reduced substantially to a speed corresponding to the reduction ratio of the power transmission mechanism.

(7) Second Deceleration Section (Sixth Speed Control Step)

Until the speed of the motor 4 reaches zero (until the count value counted by the position counter 1 reaches the count value indicating the target position), the command speed is decreased at a change rate lower than the second change rate so as to provide a negative acceleration which the inertia of both the motor 4 and the driven member 6 can follow readily.

(8) Servo Lock Section

Servo lock is achieved to avoid variations of the position of the motor 4 (and the position of the driven motor 6) due to disturbance at the target position.

Next, each speed control section is described in detail.

The first acceleration section (1) represents an amount of driving the motor 4 required from the start of the motor 4 to the elimination of the play in the gear train 5 serving as the power transmission mechanism. The play which is a mechanical dead zone is present not only in the gear train 5 but also between the motor 4 and the gear train 5, and between the gear train 5 and the driven member 6. In the first acceleration section (1), even when the entire amount of the play is at the maximum, the motor is driven by the amount required to eliminate all the play. Since FIG. 1 is a graph which illustrates the speed, the integral of values in the first acceleration section (1) represents the maximum of the play amount. The motor driving amount is obtained as a converted value for the encoder.

The first constant-speed section (2) is a set time period from the time when the separated inertia of the motor 4 and the driven member 6 are engaged with each other through the power transmission mechanism since the play in the gear train 5 serving as the power transmission mechanism is removed to eliminate the mechanical dead zone to the time when they start moving in unison after the inertia thereof reach the state of equilibrium. The time period is determined by the inertia of both the motor 4 and the driven member 6, the elastic constant of the gear train 5, friction and the like. The time period can be obtained by calculation or measurement and set in advance. Instead of the first constant-speed section (2), a section with a slower acceleration than in the first acceleration section (1) and the second acceleration section (3) may be provided (with a change rate lower than the first change rate). The time period of the first constant-speed section (2) is set on the assumption that the inertia of both the motor 4 and the driven member 6 reach the state of equilibrium at the final point of the first acceleration section (1) (that is, the play in the gear train 5 is at the maximum before the motor is driven).

In the aforementioned second acceleration section (3), the masses on the motor and the driven member move in unison. While only the mass of the motor 4 needs to be considered in the first acceleration section (1), the masses of the motor 4 and the mass of the driven member 6 need to be taken into account in the second acceleration section (3). Thus, the acceleration of the motor 4 in the second acceleration section (3) is set to be slower than the acceleration of the motor 4 in the first acceleration section (1) since the load on the motor 4 is heavier in the second acceleration section (3).

Since the DC motor 4 has a lower torque at a higher rotation speed due to counter electromotive force, it may be preferable to set a slow acceleration near the maximum speed.

The second constant-speed section (4) continues at the maximum speed until the position at which the deceleration is started (the position at which the remaining distance of movement corresponds to the integral of values in the deceleration sections on the speed curve). The command speed in this section is determined in consideration of the absolute ratings of the motor 4 and a driver thereof, the distances under acceleration and deceleration, noises and the like. This section is not always required. Specifically, when the driven member 6 is to be moved over a short distance, the first deceleration section (5) is started immediately after the aforementioned second acceleration section (3).

In the first deceleration section (5), the driven member 6 tends to maintain its moving speed by inertia but the motor 4 is braked. Thus, the inertia of the motor 4 and the inertia of the driven member 6 are separated from each other and the play again appears in the gear train 5 serving as the power transmission mechanism to recover the elastic deformation of the gear train 5. To eliminate the play in the gear train 5, similarly to the first acceleration section (1), the motor 4 is driven with deceleration until the play in the gear train 5 is eliminated in a direction opposite to the direction in the first acceleration section (1). Since the inertia of the motor 4 and the inertia of the driven member 6 are separated from each other, the deceleration is set to a value which only the inertia of the motor 4 itself can follow. The speed in the first deceleration section (5) is higher than in the first acceleration section (1), so that the former has a shorter time period than the latter (but the moving distances are the same).

The third constant-speed section (6) is a set time period from the time when the separated inertia of the motor 4 and the driven member 6 are engaged with each other through the power transmission mechanism since the play in the gear train 5 serving as the power transmission mechanism is eliminated in the opposite direction to eliminate the mechanical dead zone to the time when both they start moving in unison after the inertia thereof reach the state of equilibrium. The time period is determined by the inertia of both the motor 4 and the driven member 6, the elastic constant of the gear train 5, friction and the like, similarly to the first constant-speed section (2). Instead of the third constant-speed section (6), a section with a slower deceleration than in the first deceleration section (5) and the second deceleration section (7) may be provided (with a change rate lower than the second change rate). The time period of the third constant-speed section (6) is set, similarly to the first constant-speed section (2), on the assumption that the inertia of both the motor 4 and the driven member 6 reach the state of equilibrium at the final point of the first deceleration section (5) (that is, the play in the gear train 5 is at the maximum before the motor is driven). However, the combined inertia move in the third constant-speed section (6) while the driven member 6 is stationary by static friction in the first constant-speed section (2), so that the third constant-speed section (6) may have a shorter time period than the first constant-speed section (2).

In the second deceleration section (7), a negative acceleration is set to a value at which the combined inertia can be decelerated readily assuming that the combined inertia (masses) move in unison similarly to the second acceleration section (3). In the deceleration sections, since the friction force of the shaft and the gear train acts primarily in the direction of speed reduction, a higher change rate is set as compared with the acceleration sections.

In the servo lock section (8), the servo lock is applied to avoid displacements of the motor 4 and the driven member 6 from the target position. When the deceleration is sufficiently achieved immediately before the section (8) in accordance with the designed speed curve, the motor 4 and the driven member 6 stop gently without causing hunting as shown in FIG. 15.

Figure 15:
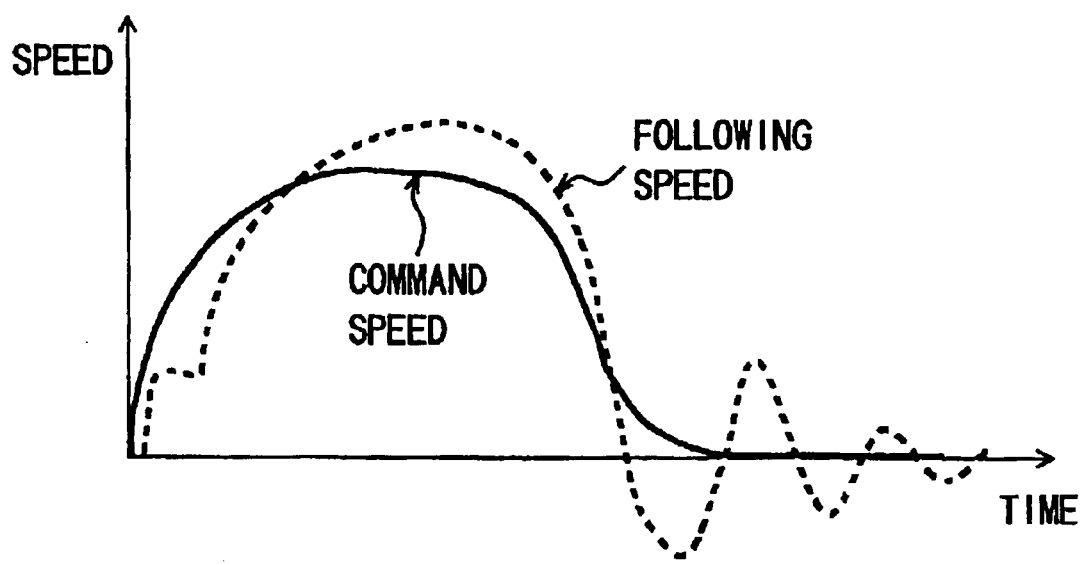
FIG. 15 shows an overshoot from a target position when the conventional position control system is used.

Next, description is made for how the hunting at the target position as shown in FIG. 15 is prevented regardless of an initial condition according to the embodiment.

Figure 3:
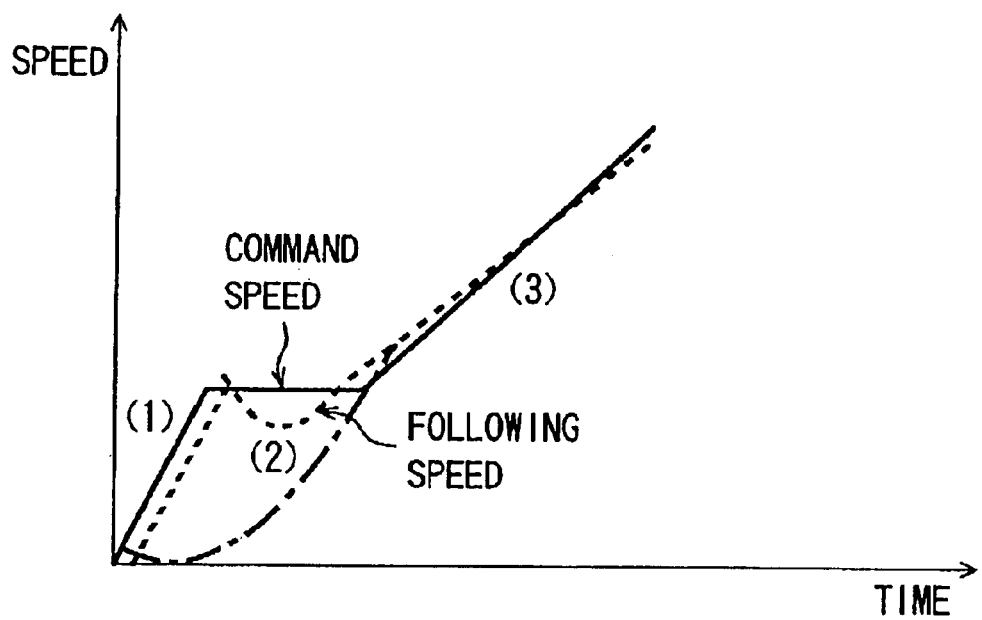
FIG. 3 shows the relationship between the command speed upon acceleration and the actual speeds of a motor and a driven member when a power transmission mechanism has large play in a forward direction in the position control system.

FIG. 3 schematically shows the relationship between the command speed and the speeds of the motor 4 and the driven member 6 (the following speed upon acceleration) when the power transmission mechanism has the largest play in a forward direction in the initial condition. A solid line shows the command speed, a dotted line the movement of the motor 4, and a dash dotted line the movement of the driven member 6, respectively. The movement of the driven member 6 is shown by values converted to ones on the motor shaft (values obtained by dividing the actual speed of the driven member 6 by the reduction ratio of the power transmission mechanism).

In the first acceleration section (1), since the driving force is transmitted only to the inertia (mass) of the motor, the command speed substantially matches the detected motor speed. The play is present in the gear train 5 until the final point of the first acceleration section (1), the driving force is hardly transmitted to the driven member 6.

Immediately before the start of the first constant-speed section (2), the motor is engaged with the driven member through the power transmission mechanism. In the first constant-speed section (2), the gear train 5 as the power transmission mechanism is elastically deformed by the driving of the motor 4, and then the gear train 5 and the driven member 6 gradually start moving. Thus, the driving system including the motor 4, the gear train 5, and the driven member 6 moves in unison. Since the first constant-speed section (2) is a previously obtained and set time period required for these changes, the driving system including the motor 4, the gear train 5, and the driven member 6 is fully able to move in unison at the time when the second acceleration section (3) is started.

In the second acceleration section (3), since the command speed is set to accelerate both the inertia of the motor 4 and the driven member 6 (with a slower acceleration than in the first acceleration section (1)), the speeds of the motor 4 and the driven member 6 can readily follow the command speed. This also applies to the deceleration.

Figure 5:
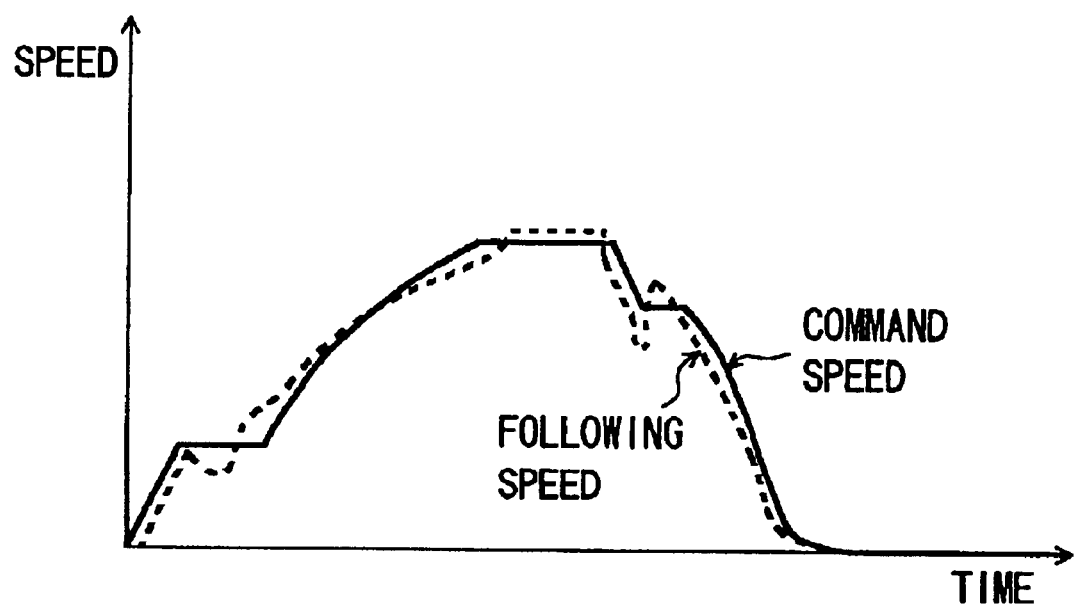
FIG. 5 shows the relationship between the command speed from acceleration to stop after deceleration and the actual speed (following speed) of the motor when the power transmission mechanism has large play in the forward direction in the position control system.

It is apparent from the foregoing that, according to this embodiment, a large overshoot or hunting as shown in FIG. 15 is not produced, and the motor 4 can be stopped substantially at the target position as shown in FIG. 5, even when the power transmission mechanism has play in the initial condition. While FIG. 5 does not show the movement of the driven member 6 (the following speed), the movement of the driven member 6 is substantially the same as the movement of the motor 4 in the second acceleration section (3), the second constant-speed section (4), and the second deceleration section (7), and no overshoot is produced near the target position.

Figure 4:
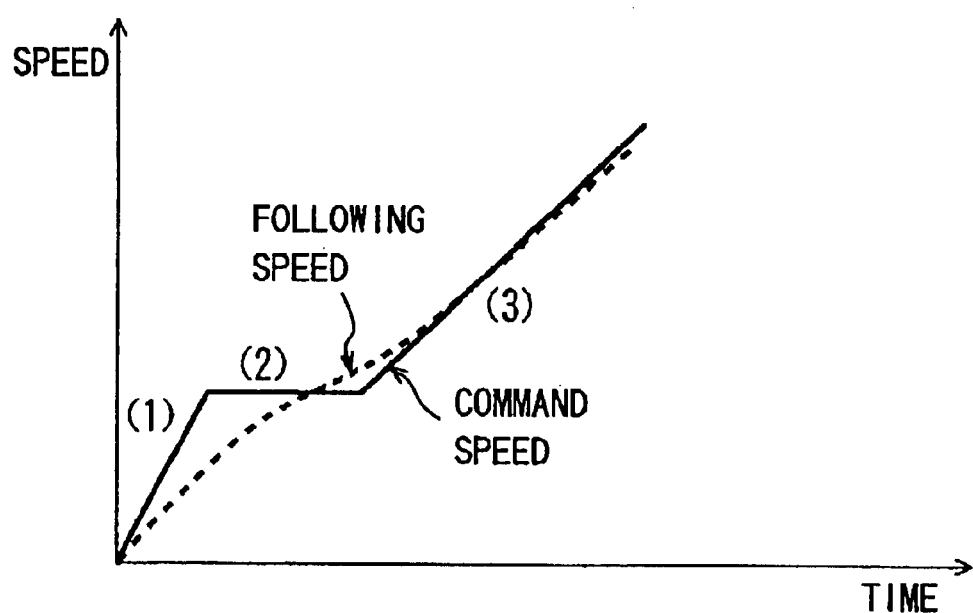
FIG. 4 shows the relationship between the command speed upon acceleration and the actual speed of the motor and the driven member when the power transmission mechanism has no play in the forward direction in the position control system.

Next, FIG. 4 shows the relationship between the command speed upon acceleration and the actual speed of the motor 4 and the driven member 6 when the power transmission mechanism has no play in the forward direction in the initial condition. A solid line shows the command speed, and a dotted line represents the actual movement of the motor 4 and the driven member 6 (the following speed).

In the first acceleration section (1), it is assumed that only the load of the motor 4, that is, the inertia of the motor 4 is accelerated. Thus, on this condition that the inertia (mass) of the motor 4 and the inertia (mass) of the driven member 6 must be accelerated simultaneously, the speed of the motor 4 is lower than the command speed at an early time of the acceleration.

From the start of the driving, however, the gear train 5 as the power transmission mechanism starts elastic deformation. The detected speed of the motor 4 can catch up with the command speed at an early time in the first constant-speed section (2).

At the time when the second acceleration section (3) is started, the driving system is in the same state as when the play is present. Then, the motor 4 and the driven member 6 can be stopped stably at the target position as described above.

The time period and the driving amount required for the inertia (mass) of the motor 4 and the inertia (mass) of the driven member 6 to start moving in unison depend on the amount of play in the initial condition. In any case, the inertia (mass) of the motor 4 and the inertia (mass) of the driven member 6 can move in unison at the time of end of the first constant-speed section (2).

The time periods set in the first acceleration section (1), the first constant-speed section (2) and the like can be determined previously by calculation or actual measurement. Control in the semi-closed system need not be performed in this case.

Figure 6:
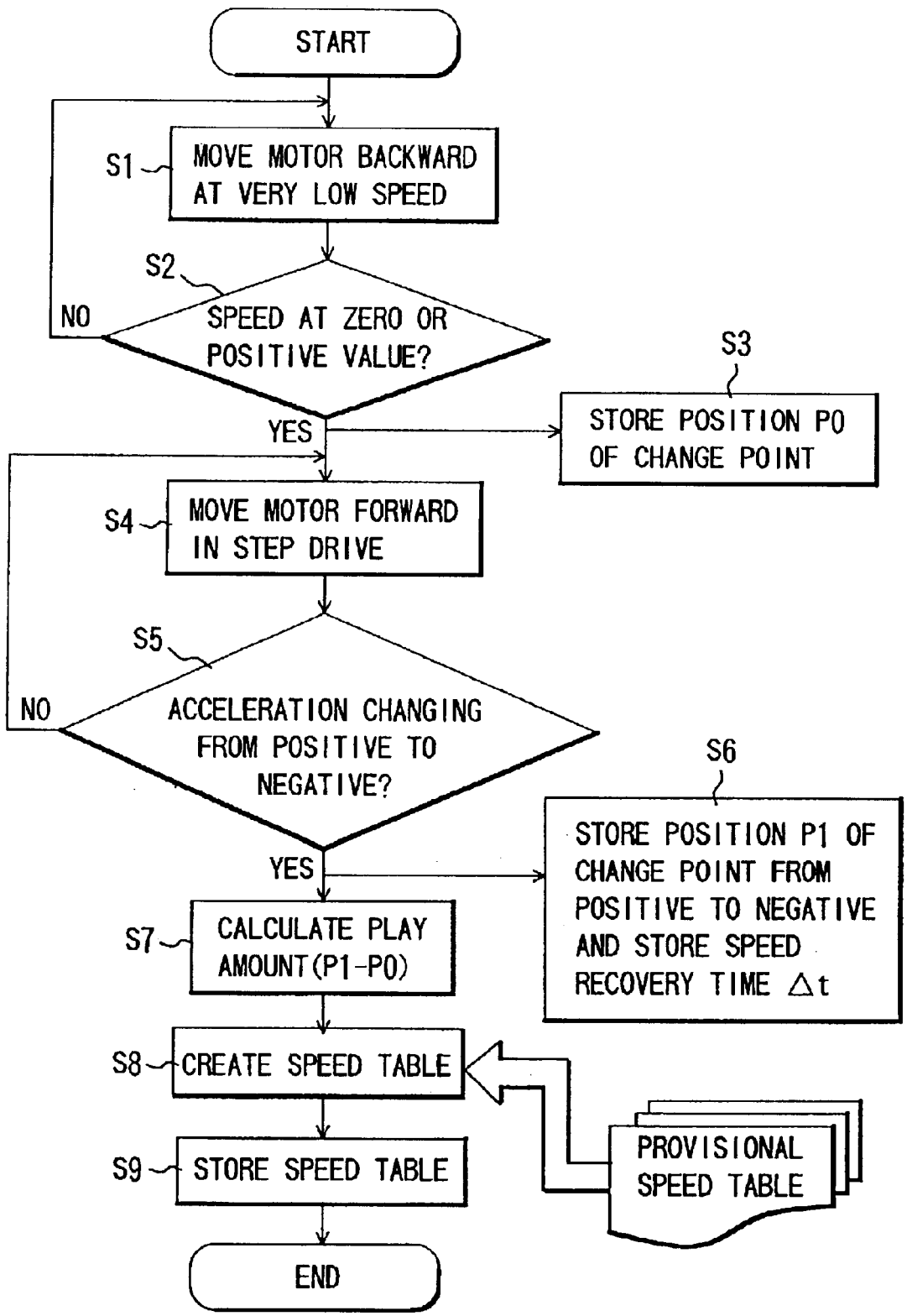
FIG. 6 is a flow chart of detecting the amount of play in the position control system.

FIG. 6 shows a flow chart illustrating an exemplary sequence of detecting the amount of play in the power transmission mechanism. The operation in the flow chart has only to be performed at predetermined movement start positions as required, for example, at the time of initialization of the position control system. A step is abbreviated as "S" in FIG. 6.

At step 1, the microcomputer 3 drives the motor 4 in a direction opposite to the normal forward direction, that is, moves the motor 4 backward, at a very low speed.

At step 2, the microcomputer 3 detects a position at which the speed of the motor 4 is zero since the motor 4 collides against the gear train 5 (the power transmission mechanism) as a loading side, or the speed of the motor 4 is reversed from negative to positive (the motor is moved in the normal forward direction) since the motor 4 bounds off by collision impact. The torque of the motor 4 is set to be low such that only the motor 4 can be driven without driving the load. If the position can be detected, the sequence proceeds to steps 3 and 4. If not, the operation at step 1 is repeated.

At step 3, the storage circuit 7 stores the position detected at step 2 as P0. P0 indicates the position of the play at one end when the power transmission mechanism has the largest play.

Figure 7:
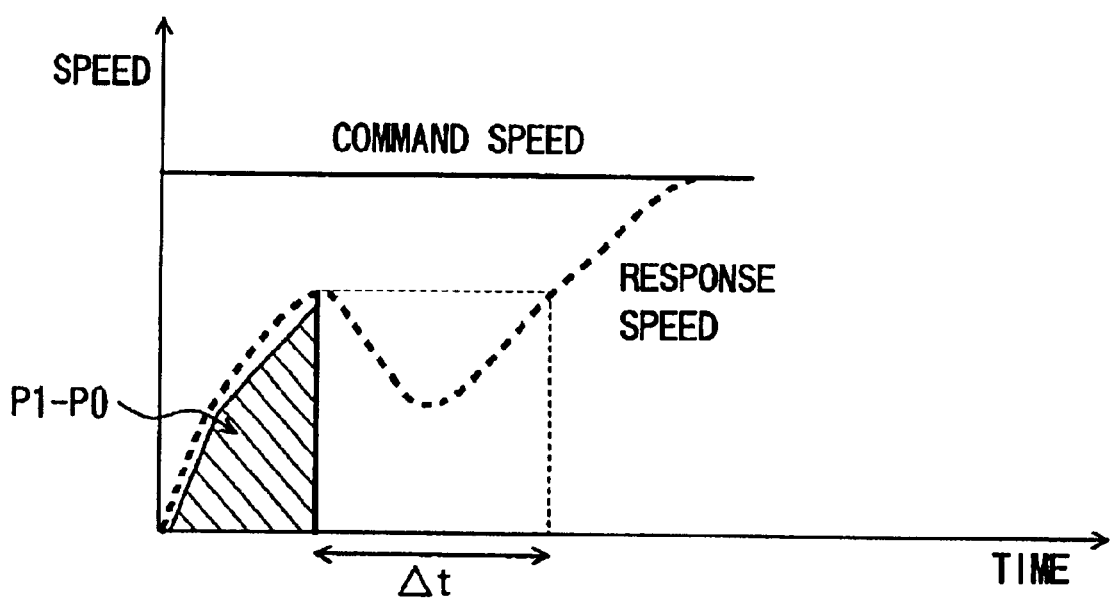
FIG. 7 is a graph for explaining a method of detecting the amount of play in the position control system.

At step 4, the motor 4 is driven in the normal forward direction by supplying a step-shaped driving command suitable for providing torque required to drive the motor 4 and the driven member 6. FIG. 7 shows a change in the speed of the motor 4 in this case.

At step 5, the microcomputer 3 detects a position at which the acceleration of the motor 4 changes from positive to negative since the motor 4 collides against the gear train 5 to start elastic deformation of the gear train 5 (the power transmission mechanism). If the position can be detected, the sequence proceeds to steps 6 and 7. If not, the operation at step 4 is repeated.

At step 6, the storage circuit 7 stores the position detected at step 5 as P1. P1 indicates the position of the play at the other end when the power transmission mechanism has the largest play. The speed of the motor 4 is once reduced as compared with the speed at P1, and then increased again to reach the same speed as that at P1. At this point, the inertia (mass) of the motor 4 and the inertia (mass) of the driven member 6 start moving in unison. A time period $\Delta t$ from the position P1 to the point at which the motor speed is equal to the speed at the position P1 after the speed reduction is measured and stored in the storage circuit 7. The driving time periods of the first constant-speed section (2) and the third constant-speed section (6) can be obtained from the value of $\Delta t$.

At step 7, the maximum play amount of the power transmission mechanism is obtained by subtracting P0 from P1.

At step 8, a provisional speed table stored previously in the storage circuit 7 is read and modified with the obtained time period $\Delta t$ and the maximum play amount of the power transmission mechanism to form a regular speed table.

At step 9, the regular speed table is stored in the storage circuit 7.

When a fixing mechanism is used for locking and holding the driven member 6, the maximum play amount can be detected without driving the driven member 6 by previously fixing the driven member 6. In this case, however, the time period $\Delta t$ must be calculated on the basis of the elastic constant of the gear train 5 or the like or measured separately.

While this embodiment has been described for the use of the DC motor as the driving source, any driving source may be used as long as the driving system is used to drive the driven member through the power transmission mechanism such as the gear train and perform feedback control of the driving source based on the driving position of the output part of the driving source provided by the position sensor.

Figure 8:
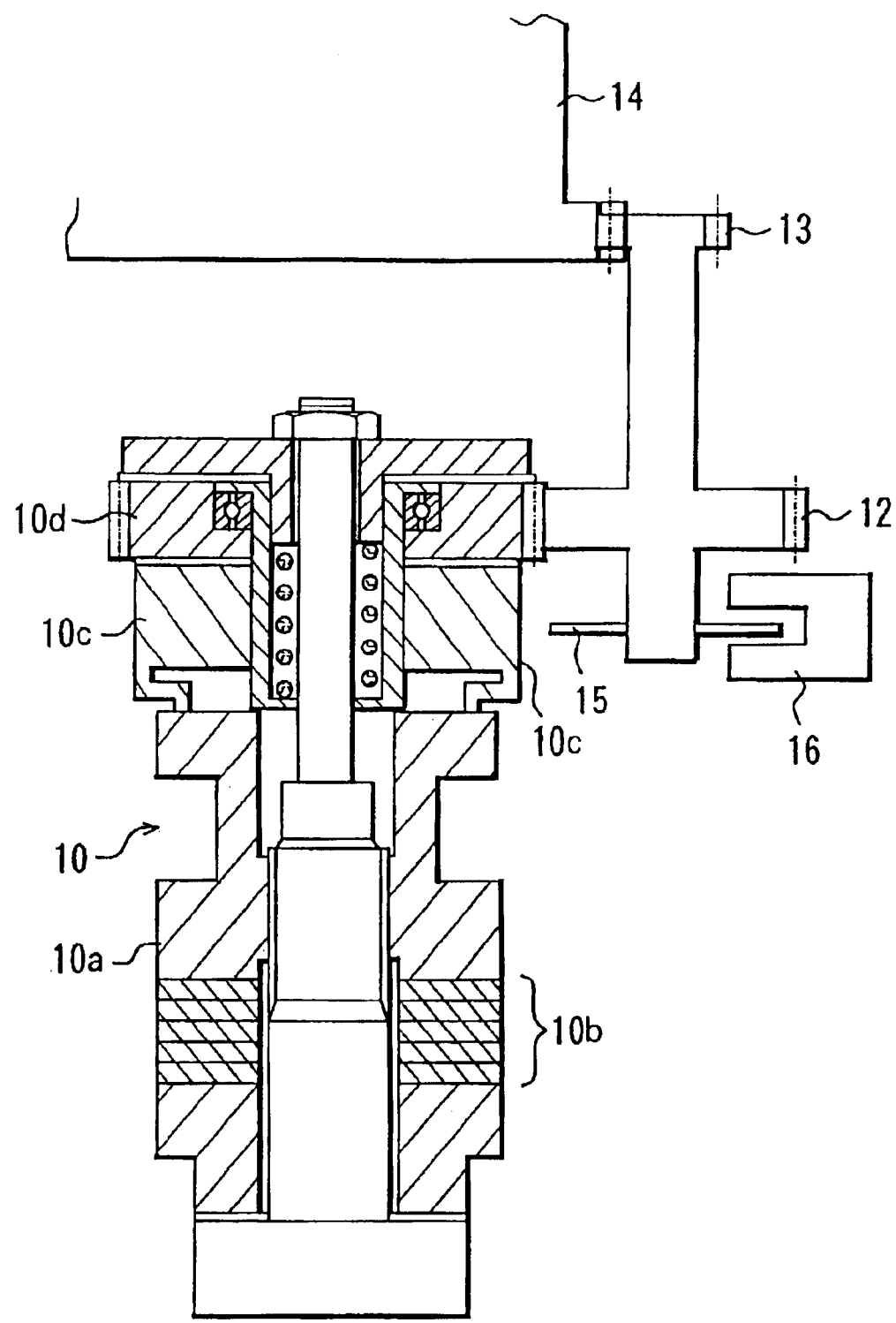
FIG. 8 is a section view of a driving unit for a lens barrel to which the position control system is applied.

By way of example, FIG. 8 shows a driving unit for a lens barrel of a camera or the like using a vibrating type motor. Reference numeral 10 shows a pencil type vibrating type motor. Reference numerals 12 and 13 show gear train units (power transmission mechanism), 15 a pulse plate, and 16 an encoder formed of a photo interrupter or the like which structures the position detector together with the pulse plate 15. Reference numeral 14 shows a component of the lens barrel serving as the driven member (load), which is, for example, a cam ring or the like for driving a zoom lens in an optical axis direction.

The vibrating type motor 10 comprises an elastic body 10a, a piezoelectric element 10b provided below the elastic body 10a, and a rotor 10c in press contact with the top surface of the elastic body 10a by spring force. A current is passed through the piezoelectric element 10b to cause the elastic body 10a to vibrate, thereby rotating the rotor 10c in press contact with the elastic body 10a. The rotation of the rotor 10c is transmitted to the component 14 of the lens barrel through the gear train unit 12 and 13 from the gear train 10d which rotates with the rotor 10c in unison.

While the vibrating type motor is used in this example, a control method similar to that in the embodiment is also effective since the torque is transmitted through the gear train. Although the speed can be controlled by the pulse width in this case, speed control by a driving frequency is often used due to a wide dynamic range.

Figure 9:
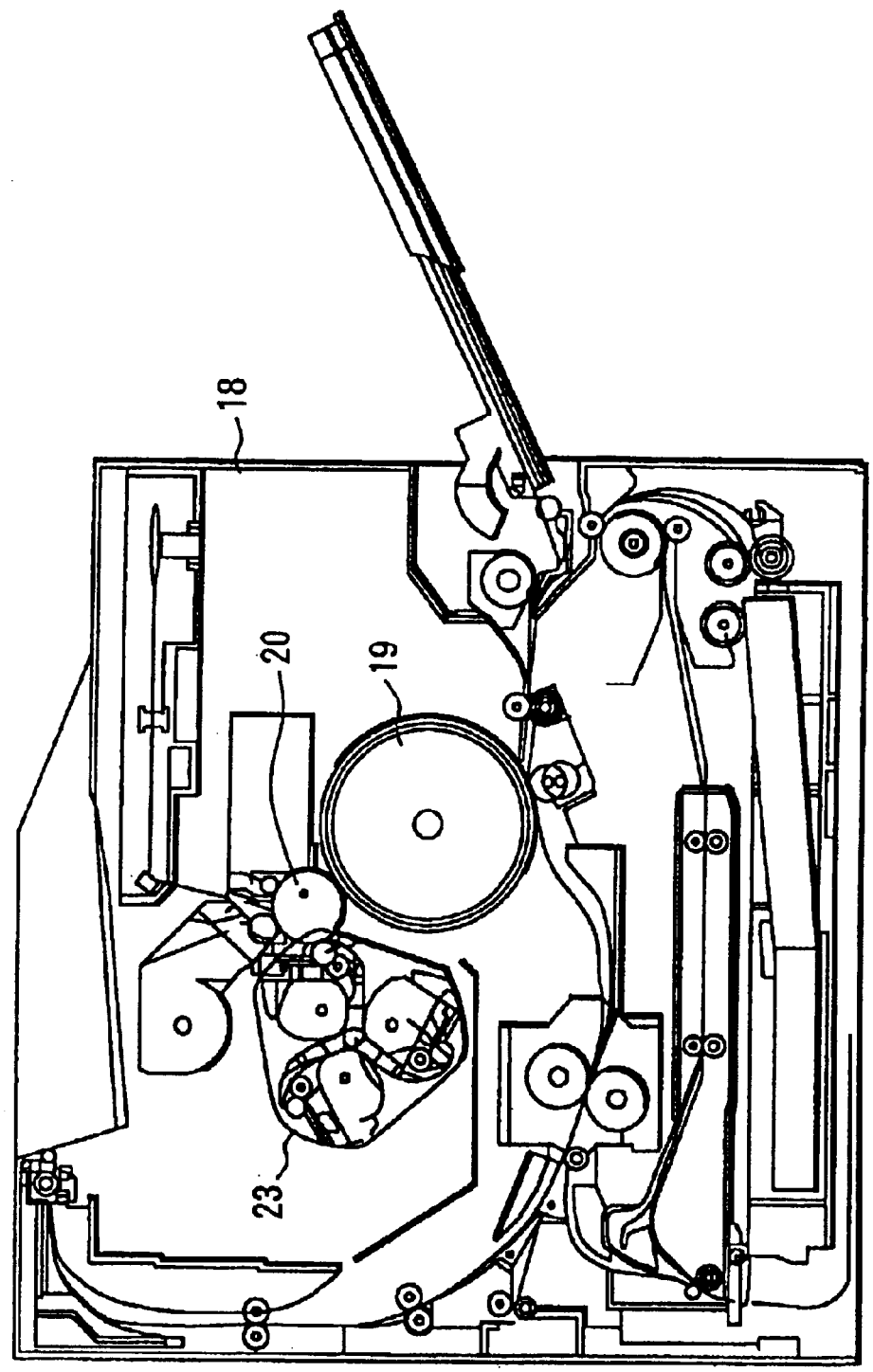
FIG. 9 is a section view of a multicolor image forming apparatus to which the position control system is applied.

FIG. 9 shows the structure of a multicolor image forming apparatus which comprises the position control system described above. Reference numeral 20 shows a photoconductive drum which is exposed to laser light or the like on its surface to form a latent image, 23 a rotation type development unit which applies developers for different colors in turn to the latent image formed on the photoconductive drum 20 to develop a visible image, and 19 an intermediate transfer drum which transfers the single color visible image developed by the rotation type development unit 23 to a recording sheet and superposes the visible images of different colors to form a colored image.

The position control system described above is effective in a system in which a driven member has large inertia and a power transmission mechanism has large play. In FIG. 9, the rotation type development unit 23, the photoconductive drum 20, and the intermediate transfer drum 19 each correspond to the driven member.

Figure 10:
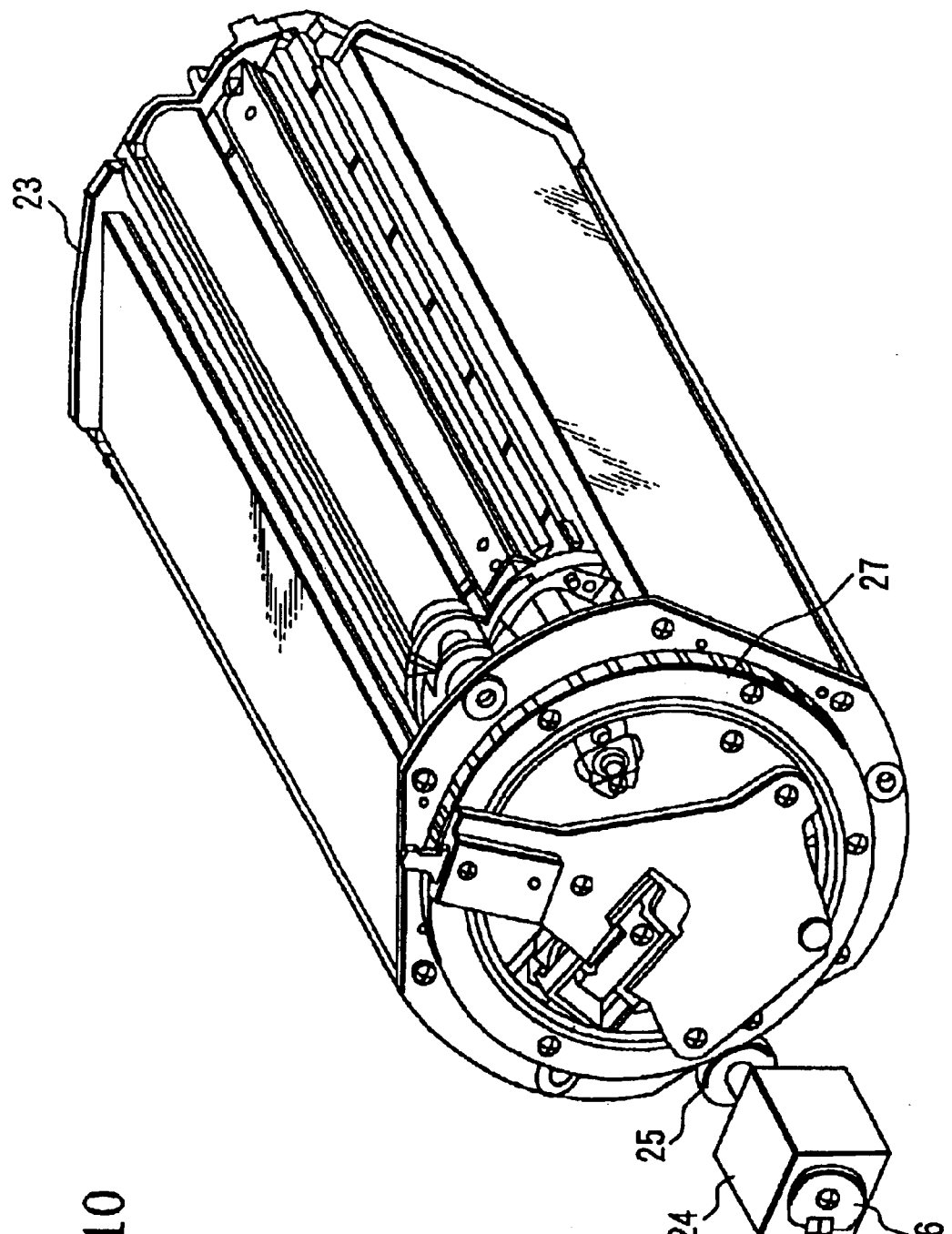
FIG. 10 shows a rotation type development unit of the multicolor image forming apparatus.

FIG. 10 is a partially enlarged view of the rotation type development unit 23 shown in FIG. 9. A rotary encoder 26 is directly connected to a DC motor 24 serving as the driving source to allow detection of the position of the DC motor 24.

The driving force of the motor is directed to the rotation type development unit 23 serving as the driven member through gear trains 25 and 27 (the power transmission mechanism).

The rotation type development unit 23 is structured to hold cartridges containing the developers for different colors, and is positioned to development points in a predetermined order of colors.

Figure 11:
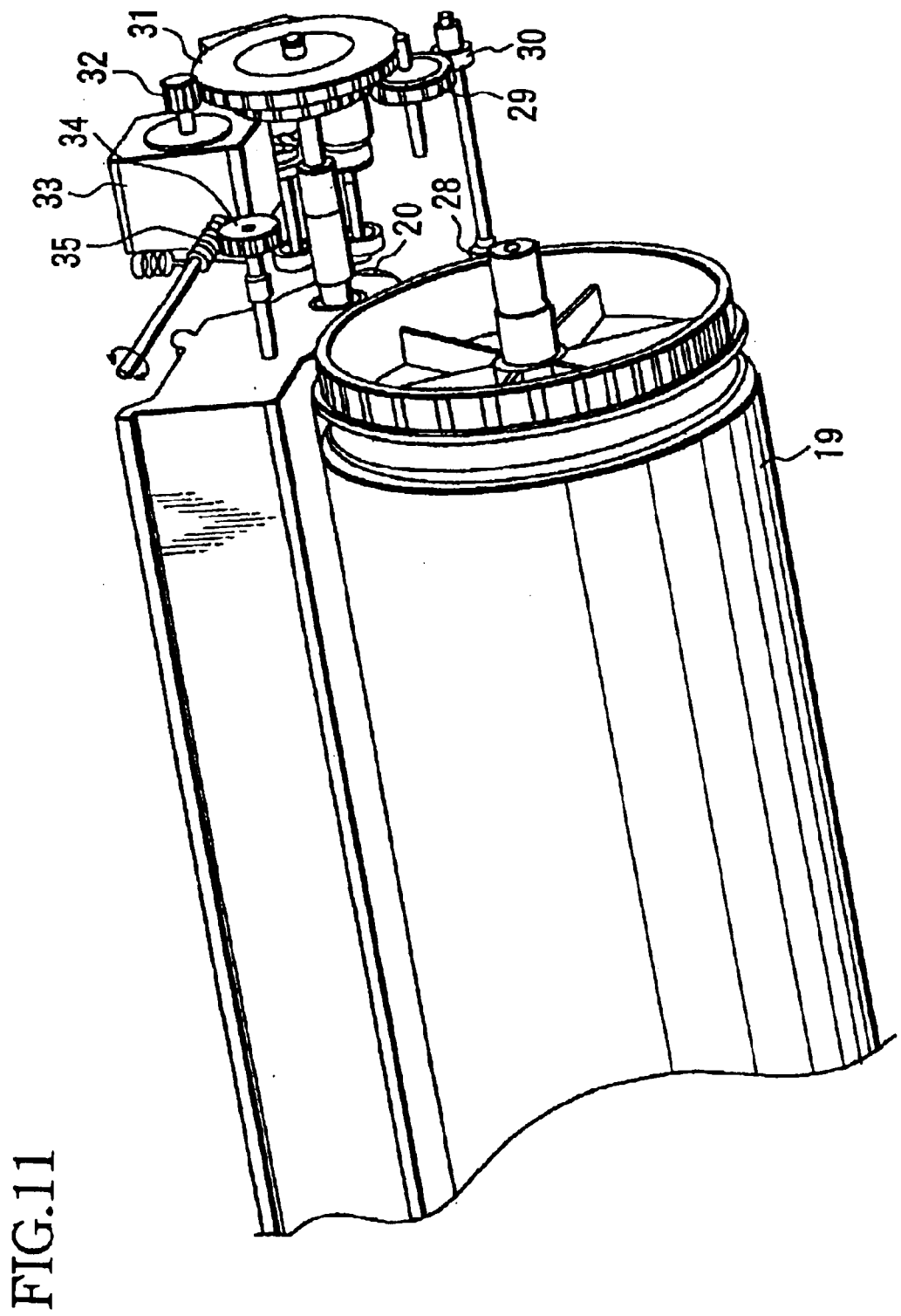
FIG. 11 shows a photoconductive drum and an intermediate transfer drum of the multicolor image forming apparatus.
Figure 12:
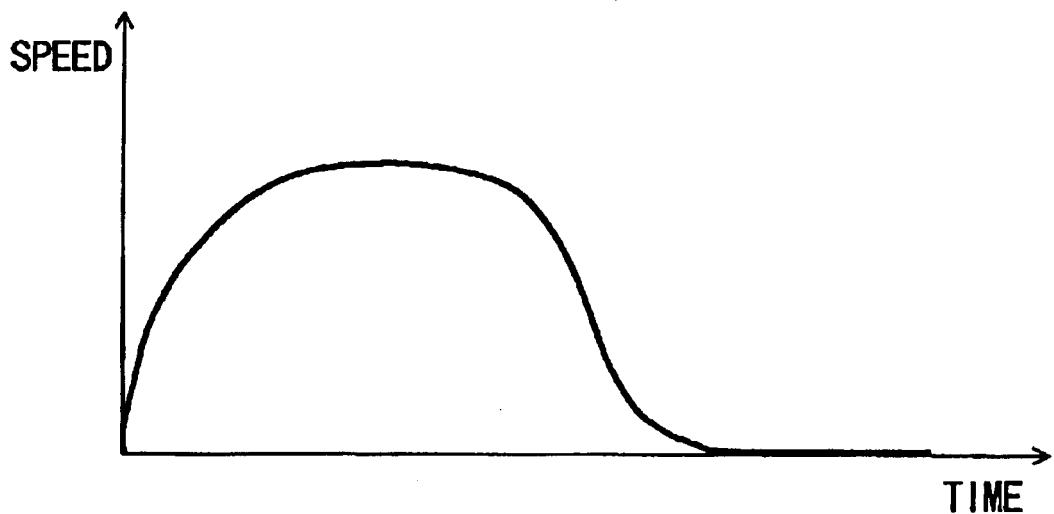
FIG. 12 shows a speed change pattern of a conventional position control system.
Figure 13:
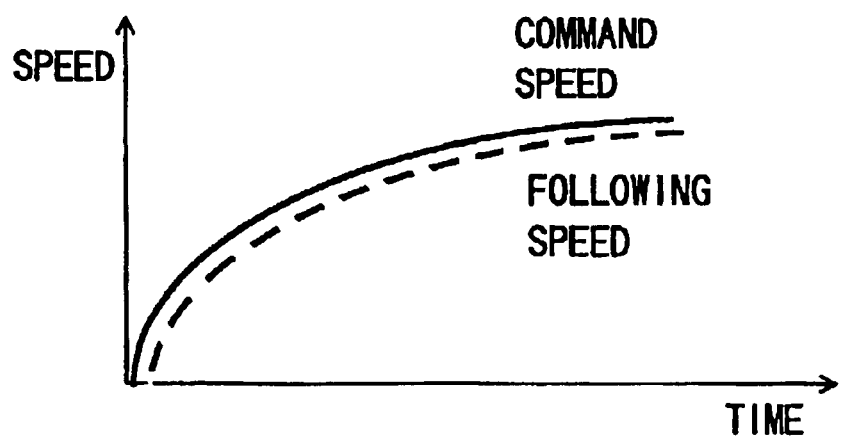
FIG. 13 shows the relationship between a command speed and the actual following speed of a motor and a driven member when a power transmission mechanism has no play in a forward direction in the conventional position control system.
Figure 14:
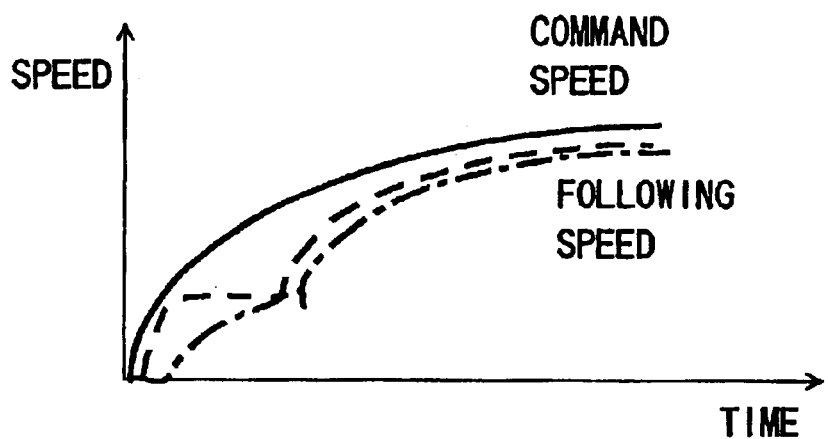
FIG. 14 shows the relationship between the command speed and the actual following speeds of the motor and the driven member when the power transmission mechanism has large play in the forward direction in the conventional position control system.

FIG. 11 is a partially enlarged view of the photoconductive drum 20 and the intermediate transfer drum 19 shown in FIG. 9. Driving force from a motor 33 is directed to the photoconductive drum 20 and the intermediate transfer drum 19 through gear trains 28 to 32, 34, and 35.

The gear train 31 is structured as a multi-stage gear train to allocate the power to the two loads of the photoconductive drum 20 and the intermediate transfer drum 19.

Since the rotation type development unit 23 has a large moment of inertia, and the gear trains are formed in many stages and provide a large reduction ratio, the play amount of the driven member is at a large value viewed from the encoder 26.

Therefore, the position control method described above is significantly effective in positioning these driving system for finding the start position or the like.

While the aforementioned embodiment has been described for the application of the position control method according to the embodiment of the present invention to the driving system for the lens barrel or the image forming apparatus, the position control method is applicable to various apparatuses having a driving system which transmits driving force of a driving source to a driven member through a power transmission mechanism, not limited to the aforementioned ones.

In addition, the present invention is realized with a program for performing the embodiment, and with a storage medium which has the program stored thereon.

While preferred embodiments have been described, it is to be understood that modification and variation of the present invention may be made without departing from scope of the following claims.

What is claimed is:

1. A position control method for use in a driving apparatus comprising a driving source which drives a driven member through a power transmission mechanism and position detecting circuit detecting a driving position of said driving source, and outputting a speed command to said driving source to perform speed control, said method of performing control such that the driving position detected by said position detecting circuit reaches a target position, said method comprising:

a first speed control step of changing said speed command to an acceleration side at a change rate to drive said driving source with acceleration by at least a driving amount corresponding to an amount of a maximum mechanical dead zone of said power transmission mechanism;

a second speed control step of maintaining said speed command constant or changing said speed command to the acceleration side at a change rate lower than the change rate at said first speed control step during driving of said driving source by a driving amount required for a driving speed of said driven member to reach a speed corresponding to a speed of said driving source and a design speed change ratio of said power transmission mechanism after said first speed control step;

a third speed control step of changing said speed command to the acceleration side after said second speed control step;

a fourth speed control step of changing said speed command to a deceleration side at a change rate to decelerate said driving source by at least the driving amount corresponding to the maximum mechanical dead zone of said power transmission mechanism after said third speed control step;

a fifth speed control step of-maintaining said speed command constant or changing said speed command to the deceleration side at a change rate lower than the change rate of said fourth speed control step during driving of said driving source by a driving amount required for the driving speed of said driven member to reach a speed corresponding to a speed of said driving source and the design speed change ratio of said power transmission mechanism after said fourth speed control step; and a sixth speed control step of changing said speed command to the deceleration side to stop said driving source at said target position after said fifth speed control step.

2. The position control method according to claim 1, wherein the driving amount corresponding to the maximum mechanical dead zone of said power transmission mechanism is determined before position control is performed.

3. The position control method according to claim 2, wherein values of said speed command in said first speed control step and said fourth speed control step obtained on the basis of the driving amount corresponding to the maximum mechanical dead zone of said power transmission mechanism are stored in a storage circuit.

4. The position control method according to claim 2, wherein the maximum mechanical dead zone of said power transmission mechanism is determined by detecting a position at which said driving source driven in one direction collides against said power transmission mechanism and a position at which said driving source driven in an opposite direction collides against said power transmission mechanism.

5. The position control method according to claim 1, wherein the driving amount required for the driving speed of said driven member to reach the speed corresponding to the speed of said driving source and the design speed change ratio of said power transmission mechanism in said second speed control step is determined before position control is performed.

6. The position control method according to claim 5, wherein values of said speed command in said second speed control step and said fifth speed control step obtained on the basis of the driving amount required for the driving speed of said driven member to reach the speed corresponding to the speed of said driving source and the design speed change ratio of said power transmission mechanism are stored in a storage circuit.

7. The position control method according to claim 1, wherein, in said third speed control step, said speed command is changed to the acceleration side at a change rate which is lower than the change rate in said first speed control step and larger than the change rate in said second speed control step.

8. The position control method according to claim 1, wherein, in said sixth speed control step, said speed command is changed to the deceleration side at a change rate which is lower than the change rate in said fourth speed control step.

9. The position control method according to claim 1, wherein said power transmission mechanism is formed of a single gear or a plurality of gears, and said mechanical dead zone is backlash or play.

10. A position control system comprising:
a driving source;
a power transmission member which transmits an output from said driving source to a driven member;
a position detecting circuit which detects a driving position of said driving source; and
a control circuit which supplies a speed command to said driving source to control driving of said driving source such that the driving position detected by said position detecting circuit reaches a target position,
wherein said control circuit performs first speed control of changing said speed command to an acceleration side at a change rate to drive said driving source with acceleration by at least a driving amount corresponding to a maximum mechanical dead zone of said power transmission mechanism,
said control circuit performs second speed control of maintaining said speed command constant or changing said speed command to the acceleration side at a change rate lower than the change rate at said first speed control during driving of said driving source by a driving amount required for a driving speed of said driven member to reach a speed corresponding to a speed of said driving source and a design speed change ratio of said power transmission mechanism after said first speed control,
said control circuit performs third speed control of changing said speed command to the acceleration side after said second speed control,
said control circuit performs fourth speed control of changing said speed command to a deceleration side at a change rate to decelerate said driving source by at least the driving amount corresponding to the maximum mechanical dead zone of said power transmission mechanism after said third speed control,
said control circuit performs fifth speed control of maintaining said speed command constant or changing said speed command to the deceleration side at a change rate lower than the change rate at said fourth speed control during driving of said driving source by a driving amount required for the driving speed of said driven member to reach a speed corresponding to a speed of said driving source and the design speed change ratio of said power transmission mechanism after said fourth speed control, and
said control circuit performs sixth speed control of changing said speed command to the deceleration side to stop said driving source at said target position after said fifth speed control.

11. The position control system according to claim 10, wherein the driving amount corresponding to the maximum mechanical dead zone of said power transmission mechanism is determined before position control is performed.

12. The position control system according to claim 11, wherein said control circuit stores values of said speed command in said first speed control and said fourth speed control obtained on the basis of the driving amount corresponding to the maximum mechanical dead zone of said power transmission mechanism in a storage circuit.

13. The position control system according to claim 11, wherein the maximum mechanical dead zone of said power transmission mechanism is obtained by detecting a position at which said driving source driven in one direction collides against said power transmission mechanism and a position at which said driving source driven in an opposite direction collides against said power transmission mechanism.

14. The position control system according to claim 10, wherein the driving amount required for the driving speed of said driven member to reach the speed obtained on the basis of the speed of said driving source and the design speed change ratio of said power transmission mechanism in said second speed control is determined before position control is performed.

15. The position control system according to claim 14, wherein said control circuit stores values of said speed command in said second speed control and said fifth speed control obtained on the basis of the driving amount required for the driving speed of said driven member to reach the speed corresponding to the speed of said driving source and the design speed change ratio of said power transmission mechanism in a storage circuit.

16. The position control system according to claim 10, wherein, in said third speed control, said control circuit changes said speed command to the acceleration side at a change rate which is lower than the change rate in said first speed control and larger than the change rate in said second speed control.

17. The position control system according to claim 10, wherein, in said sixth speed control, said control circuit changes said speed command to the deceleration side at a change rate which is lower than the change rate in said fourth speed control.

18. The position control system according to claim 10, wherein said power transmission mechanism is formed of a single gear or a plurality of gears, and said mechanical dead zone is backlash or play.

19. The position control system according to claim 10, wherein said driving source is a DC motor, and said control circuit changes a pulse width of a pulse signal serving as the speed command supplied to said DC motor.

20. The position control system according to claim 10, wherein said driving source is a vibrating type motor in which a vibrator produces a traveling-wave to rotate a rotor, and said control circuit changes a frequency of a frequency signal serving as the speed command supplied to said vibrating type motor.

21. The position control system according to claim 10, wherein said position detecting circuit is an encoder which can detect a driving direction of said driving source.

22. The position control system according to claim 10, wherein said control circuit comprises a proportional, integral, derivative operation section to perform at least one of a proportional operation, an integral operation, a derivative operation on a deviation of the position detected by said position detecting circuit from a command position obtained by integrating values of the speed command stored in a storage circuit.

* * * * *

UNITED STATES PATENT AND TRADEMARK OFFICE
CERTIFICATE OF CORRECTION

PATENT NO. : 6,906,488 B2 Page 1 of 1
DATED : June 14, 2005
INVENTOR(S) : Tadashi Hayashi It is certified that error appears in the above-identified patent and that said Letters Patent is hereby corrected as shown below:

<u>Column 12,</u>
Line 20, delete "step of-maintaining" and insert -- step of maintaining --.

Signed and Sealed this

Twenty-eighth Day of March, 2006

JON W. DUDAS
*Director of the United States Patent and Trademark Office*